Sept. 21, 1965 G. H. TITT 3,207,278
ONE-WAY SPRAG CLUTCH WITH SPRING MEANS
Filed Feb. 4, 1963 4 Sheets-Sheet 1

INVENTOR
GEORG HERMANN TITT

Kenyon, Palmer, Stewart & Estabrook
ATTORNEYS

Sept. 21, 1965  G. H. TITT  3,207,278
ONE-WAY SPRAG CLUTCH WITH SPRING MEANS
Filed Feb. 4, 1963  4 Sheets-Sheet 2

INVENTOR
GEORG HERMANN TITT

Kenyon, Palmer, Steward & Estabrook
ATTORNEYS

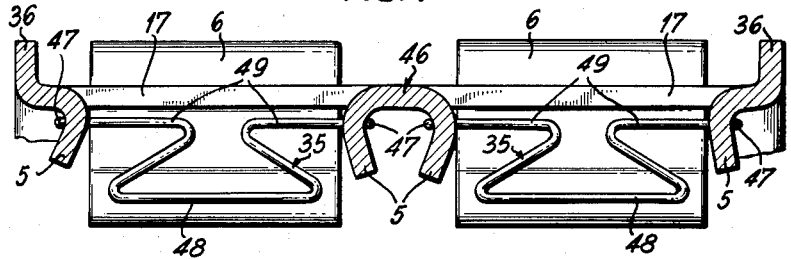
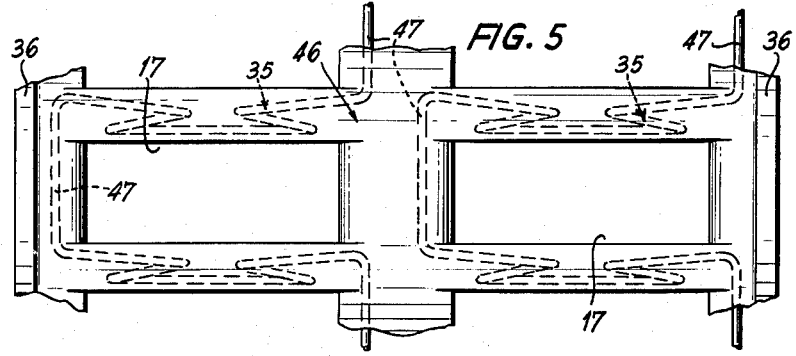
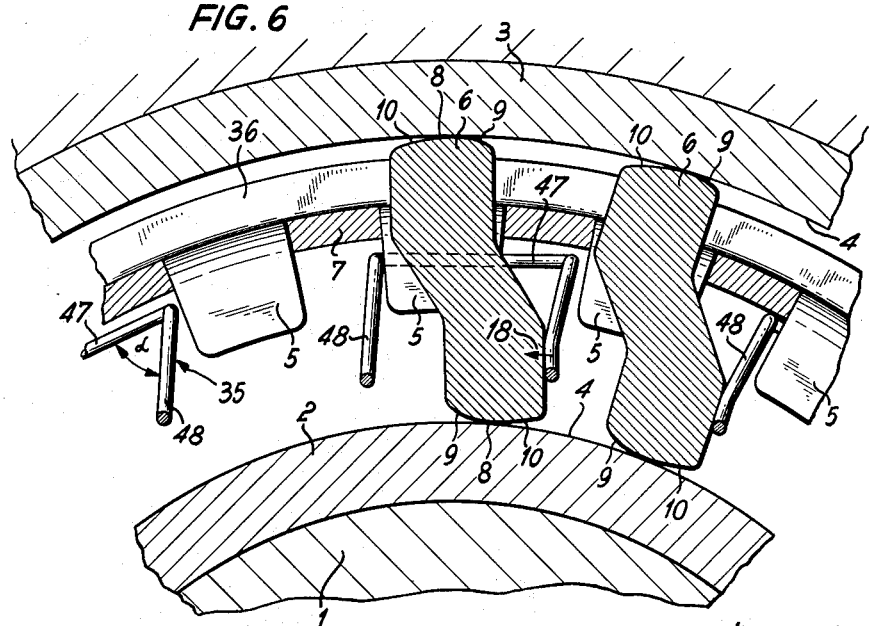

Sept. 21, 1965　　　　　G. H. TITT　　　　　3,207,278
ONE-WAY SPRAG CLUTCH WITH SPRING MEANS
Filed Feb. 4, 1963　　　　　　　　　　　　4 Sheets-Sheet 4

INVENTOR
GEORG HERMANN TITT

ATTORNEYS

United States Patent Office 3,207,278
Patented Sept. 21, 1965

3,207,278
ONE-WAY SPRAG CLUTCH WITH
SPRING MEANS
Georg Hermann Titt, Hilpoltstein, Mittelfranken, Germany, assignor to Albert, Titt & Co., Hilpoltstein, Mittelfranken, Germany, a firm
Filed Feb. 4, 1963, Ser. No. 255,843
Claims priority, application Germany, Feb. 8, 1962,
A 39,408
6 Claims. (Cl. 192—45.1)

The present invention relates to a one-way sprag clutch and more particularly to a sprag clutch in which the individual sprags are supported in a common cage and each is individually subjected to a spring pressure by a common spring.

One-way sprag clutches are known and an example may be found in the U.S. Patent to Dodge, 2,731,122, 1956. Generally, clutches of this type have a relatively short life. In an effort to lengthen the life of clutches of this type, the art has gone to relatively larger sizes of sprags but the larger the sprags, the larger must be the spring for biasing the sprags in the direction of clutch engagement. The combination of large heavy sprags and heavy springs, however, in turn results in considerable friction when the clutch is disengaged or running idle.

Accordingly, it is the principal object of the present invention to provide in a sprag clutch, a novel sprag element and supporting means therefor which is effective in prolonging the life of the clutch and in holding to a minimum the overall dimensions of all parts.

Figure 1:
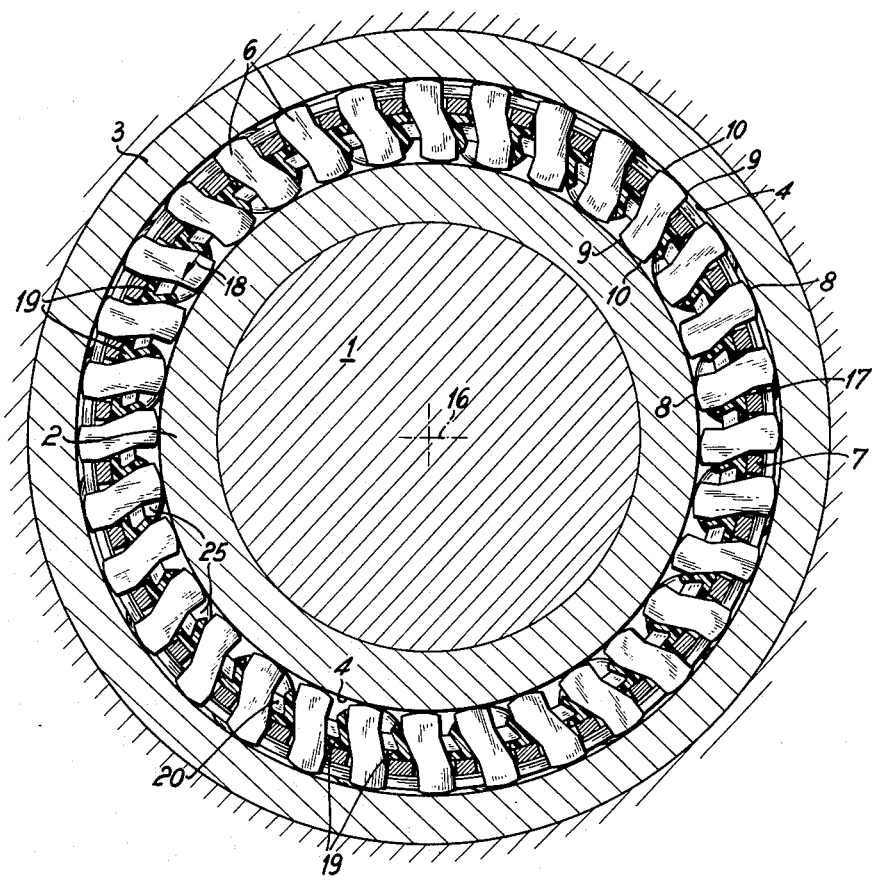
Figure 2:
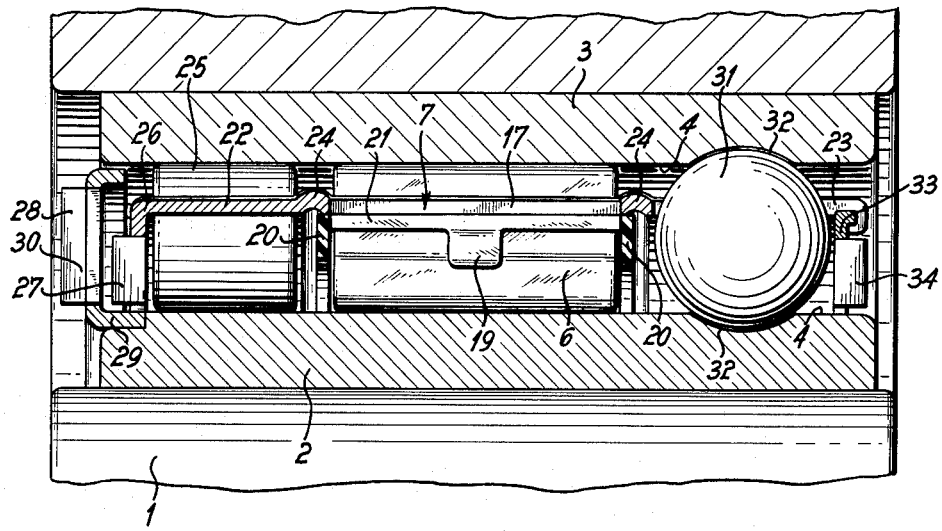
Figure 3:
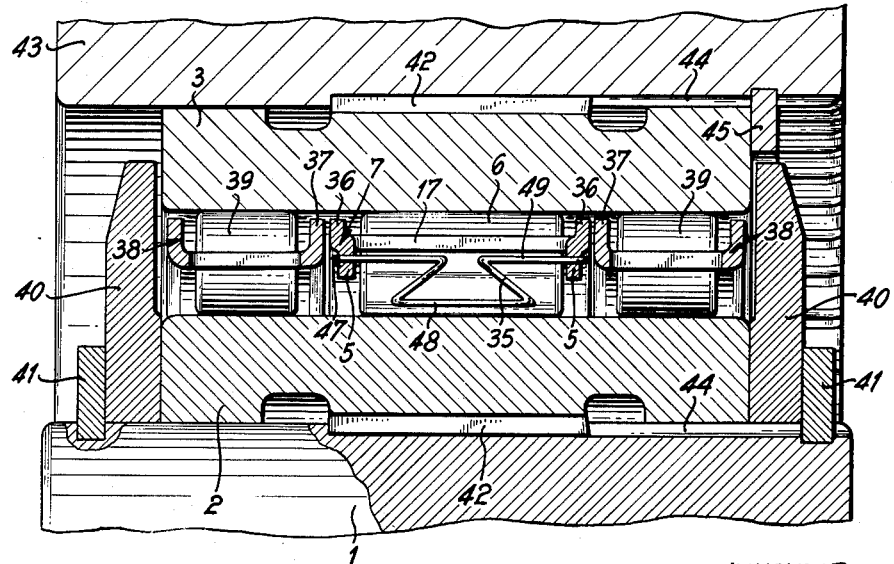

Further features, details and advantages of the invention will become apparent from the following description of several preferred forms of construction illustrated by way of example in the accompanying drawings, in which FIG. 1 is a radial section through a sprag clutch;

FIG. 2 an axial section through the clutch according to FIG. 1;

FIG. 3 a section corresponding to FIG. 2 through another form of construction;

FIG. 4 a section corresponding to FIGS. 2 and 3 through yet another form of construction, showing particularly the springs and the fixing thereof;

FIG. 5 a top plane view of the construction illustrated in FIG. 4, and

Figure 7:
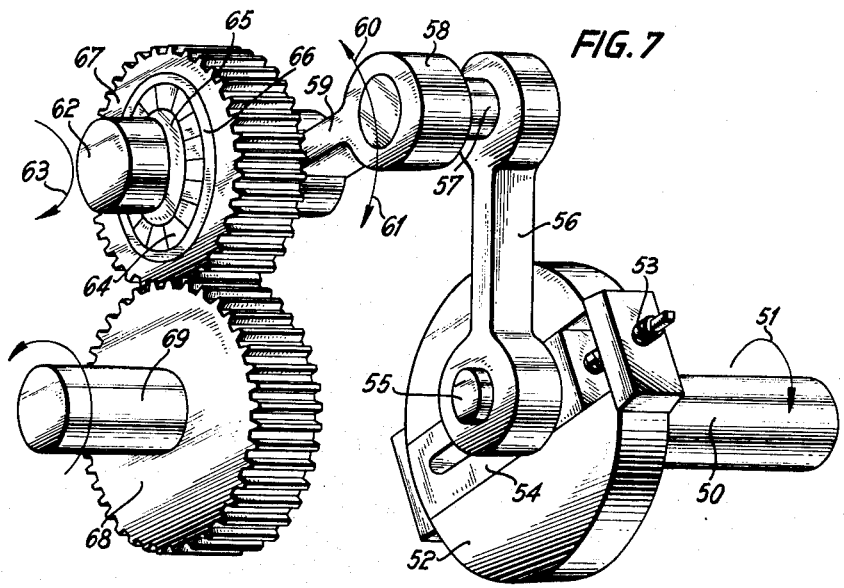
Figure 8:
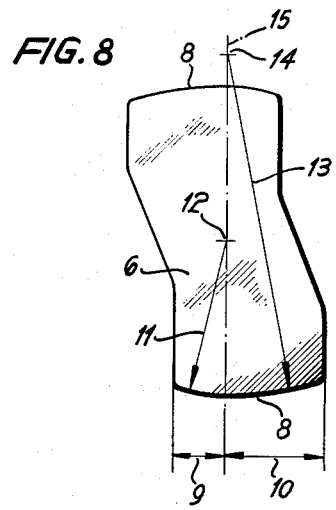

FIG. 6 a part radial section taken on line VI—VI of FIG. 1, through another form of construction, while FIG. 7 shows the use of a sprag clutch in combination with a change-speed gear, and FIG. 8 a sprag in side elevation.

In general, the objects of the present invention are achieved by providing in a one-way sprag clutch, an annular cage member having a series of apertures which receive the individual sprags in a manner permitting their free movement therein. In combination with a cage supporting a plurality of sprags, there is also provided a novel spring structure which is effective to individually bias each of the sprags toward clutch engaging position and yet such spring engages only the outer surfaces of the sprags. It is not necessary, therefore, to provide openings in the sprags such as shown in the Dodge patent mentioned herein before and thus, the individual sprags may be imperforate and thus, stronger than the ones shown in the patent to Dodge 2,731,122.

In order to increase the life of clutches in accordance with the present invention, the engaging surfaces of the individual sprags are composed of titanium carbide. Such surface hardening may be effected in a known manner as, for example, by diffusing titanium into the outer surface of the sprag so that it combines with the carbon of the steel from which the sprag is made, thereby producing the highly friction resisting titanium carbide. For this reason, it is preferable to utilize a high-carbon steel for the sprags and a carbon content of about 1½ to 2% has been found to be most advantageous.

In one of the embodiments of the present invention which will be described more fully hereinafter, the spring means comprises a wire bent in a generally circular form having a plurality of transversely extending sections with each section supported on the cage proper. In another form, the spring comprises a band of elastomeric material having a plurality of window-like apertures which surround each individual sprag and each aperture has on one side thereof a tongue member which bears against one side of each sprag.

The clutch illustrated in FIG. 1 is arranged between an inner ring 2 keyed on a shaft 1 and outer ring 3 which is positively connected to rotate with another gear element, for example, a driving or a driven wheel. The clamping surfaces 4 of the inner and outer rings are ground. In the space between the inner ring 2 and the outer ring 3 sprags 6 are distributed around the periphery, the greatest height of the blocks 6 being approximately in radial direction.

The clamping surfaces of the sprags 6 are designated by 8 and are composed of two curved sections 9 and 10 with different curvatures. The arc length of the curved section 9 is about half the length of the curved section 10. The radius of the curved section 9 is designated by 11 in FIG. 8. Its centre 12 is located about in the region of the centre of gravity of the cross-section of the block. The radius of the curved section 10 is designated by 13 and its centre is located about in radial direction outside this cross-section of the sprag 6. When running idle, the points of contact between the clamping surfaces 8 of the sprags 6 and the clamping surfaces 4 of the inner and outer rings 2, 3 are located in the region of the curved section 9 called the idle-running curve. During torque transmission by the blocks 6 these contact points are, however, located in the region of the curved section 10, called the engagement curve. The two centres 12 and 14 of the two curve radii 11 and 13 are located on a common line 15 which passes through the centre 16 of the freewheel, shown only in FIG. 1. The contour of the sprag 6 shown in heavy lines in FIG. 8 indicates that this has a surface of titanium molecules combined with the carbon in the steel of the sprag 6 on the outer side thereof.

The individual sprags 6 are guided in a cage designated as a whole by 7. This cage is provided with window-like apertures 17 which are produced by punching or some similar way. The dimensions of these apertures are so chosen that the blocks are movable therein with play. The cage consists of an endless band joined at its end by welding, soldering or the like.

These sprags 6 are loaded in the direction of the arrow 18, that is in the direction of engagement by spring tongues 19 composed of rubber, plastic or the like, which also constitute an endless structure which is held together by lateral strips 20 (FIG. 2). The spring tongues 19 are carried by transverse strips 21 which unite the two lateral longitudinal strips 20. In the form of construction illustrated in FIGS. 1 and 2 the cage 7 is provided on both sides in axial direction with extensions 22 and 23, peripheral beads or ribs 24 serving as reinforcements. The extension 22 serves for guiding the rolling bodies 25 of the centering bearing. These rolling bodies 25 run, seen in axial direction, besides the sprags 6 on the same clamping surfaces 4 of the inner ring 2 and outer ring 3. The lateral strip or web 26 of the cage extension 22 is provided with vanes or scoops 28 bent outwards at an incline, which, like the vanes or scoops 28 of a guide ring 29 fixed on the inner ring 2, convey the lubricating oil in the direction of the arrow 30 into the interior of the clutch. The oil again passes out on the opposite side of the clutch in the region of the other centering bearing formed by the bearing elements 31.

The bearing elements 31 are balls which roll in suitably recessed guide tracks or races 32 in the inner and outer rings 2 and 3 and can therefore take up certain axial forces. For guiding these bearing elements 31, the cage extension designated by 23 is provided. The bearing is closed on its outer side by a ring 33 which has vane or scoop-like projections 34 which assist the outflow of the lubricating oil from the bearing.

Whereas in the form of construction illustrated particularly in FIG. 2 the sprags 6 and the bearing elements 25 and 31 have a common cage 7, 22, 23, the cage is divided in the form of construction illustrated in FIG. 3. The cage 7 with the window-like apertures 8 for receiving the sprags is provided with laterally bent lugs 5 pointing inwards which serve for fixing the pressure springs 35 for the sprags which springs are bent from wire and hereinafter described in greater detail.

The upwardly bent side surfaces 36 of the cage 7 extend parallel to the correspondingly bent side portions 37 of the cages 38 extending axially on both sides of the cage 7 and serving as guide for the bearing elements which, in the example illustrated consist of rolling bodies 39.

The two centering bearings with the bearing elements 39 are guided by guard plates 40 which are held on the shaft 1 by means of retaining rings 41.

FIG. 3 shows that the inner ring 2 has an its inner side and the outer ring 3 on its outer side a notched toothing or the like 42, by means of which these rings are secured against rotation on the shaft 1 and on the driving element 43 respectively. These elements have correspondingly formed toothings which are designated by 44. A lock ring, designated by 45, prevents the outer ring from working loose.

In FIGS. 4 and 5 the spring common for all the sprags 6 of the freewheel is shown in combination with a cage having two rows of sprags arranged axially one behind the other and designated as a whole by 46. Each of the two separate springs 35, which are illustrated in top plan view in FIG. 5, is bent in a generally circular shape with a plurality of transversely extending sections at substantially regular intervals. The spring sections 47 extending in the longitudinal direction of the spring serve for fixing and engage alternately behind downwardly bent lugs 5 of the cage 46. The spring 35 also has on its general plane downwardly bent tongues 48 which extend transversely to the fixing sections 47. These tongues 48 bear against and bias the sprags 6 in a direction indicated by the arrow 18 (FIG. 6). They are subjected to torsion in the region of the tongue arms 49 and to bending stress in the region of the actual tongue 48. The thickness of the wire used for forming the springs 35 is dependent upon the biasing force desired. As shown in FIG. 6, the tongue 48 includes with the spring section 47 an angle $c$ of about 60° when in position of rest.

Finally FIG. 7 shows one example for the employment of a clutch according to the invention, in combination with a control switch or change-speed gear of known type. The driven shaft of this gear is designated by 50 and rotates in the direction of the arrow 51. On the end of the shaft 50 a crank disc 52 is mounted which carries a sliding block 54 radially adjustable by a spindle 53 and in turn carrying a crank pin 55. This pin 55 engages a connecting rod 56 the other end of which cooperates through the intermediary of a pin 57 with the head 58 of a crank 59 which, when the shaft 50 is driven in the direction of the arrow 51, carries out an oscillating movement designated by the double arrow 60, 61, and the amplitude of which corresponds to the distance of the pin 55 from the axis of rotation of the disc 52. If this axis of rotation coincides with the centre of the disc 52 the crank 59 and the connecting rod 56 will remain at a standstill.

If however, the crank 59 carries out the oscillating movement 60, 61, the shaft end 62 will be driven intermittently in the direction of the arrow 63. Consequently the direction of the arrow 61 of the crank movement corresponds to the engagement of the clutch, indicated only diagrammatically at 64, the inner ring 65 of which is keyed on the shaft 62 while the outer ring 66 is rigidly connected to the gear wheel 67. This gear wheel 67 in turn meshes with another gear wheel 68 from which the driven shaft 69 extends.

By duplicating this arrangement in such a manner that several gear wheels 67 mesh with the gear wheel 68, an infinitely variable gear is produced such as can be used, for example, for driving vehicles.

It is evident that the invention is not restricted to the forms of construction above described and illustrated in the accompanying drawings, but numerous variations are possible without departing from the fundamental idea of the invention.

What I claim is:
1. A one-way sprag clutch comprising:
    a pair of radially spaced concentric annular members;
    an annular cage positioned between said members and including a plurality of sprag openings therein;
    a plurality of imperforate sprags supported by said cage in engagement with the confronting surfaces of said inner and outer annular members;
    and spring means comprising an endless wire member including portions engaging said cage and other portions engaging the outer surface only of each of said sprag, said spring means independently biasing each said sprag toward clutch engaging position.

2. The combination as defined by claim 1 in which each said sprag includes engagement surfaces of titanium carbide.

3. The combination of claim 1 in which said sprags are positioned in a pair of parallel rows in said cage.

4. A one-way sprag clutch comprising:
    a pair of radially spaced concentric annular members;
    an annular cage positioned between said members and including a plurality of sprag openings therein;
    a plurality of imperforate sprags supported by said cage in engagement with the confronting surfaces of said inner and outer annular members;
    and spring means comprising a wire formed in sections extending parallel to the longitudinal direction of the spring and supported on said cage and further sections extending transversely to the longitudinal direction of the spring and having tongues in said last mentioned sections and out of the common plane of the spring and engaging only with the outer surfaces of the sprags for independently biasing each of said sprags toward clutch engaging position.

5. A one-way sprag clutch comprising:
    a pair of radially spaced concentric annular members;
    an annular cage positioned between said members and including a plurality of sprag openings therein;
    a plurality of imperforate sprags supported by said cage in engagement with the confronting surfaces of said inner and outer annular members;
    and spring means comprising a band of elastomeric material, said band including a plurality of apertures, one for each said sprag, and an inwardly extending resiliant tongue formed on one side only of each said aperture and engaging its respective sprag on the outer surface thereof and biasing each said sprag toward clutch engaging position.

6. A one-way sprag clutch comprising:

a pair of radially spaced concentric annular members;

longitudinally spaced centering bearings positioned between said annular members adjacent the ends thereof;

a pair of annular cages housing said centering bearings and including vane-like projections for conducting lubricant toward the interior of said clutch;

an annular sprag cage positioned between said inner and outer members and including a plurality of sprag openings therein;

a plurality of imperforate sprags supported by said sprag cage in engagement with the confronting surfaces of said inner and outer annular members;

and spring means engaging the outer surfaces only of each of said sprags and independently biasing each of said sprags toward clutch engaging position.

References Cited by the Examiner

UNITED STATES PATENTS

| | | | |
|---|---|---|---|
| 1,694,377 | 12/28 | De Lavand | 192—45.1 |
| 2,404,221 | 7/46 | Dodge | 192—45.1 |
| 2,597,241 | 5/52 | Gruenberg et al. | 192—45.1 |
| 2,731,122 | 1/56 | Dodge | 192—45.1 |
| 2,793,729 | 5/57 | Cobb | 192—45.1 |
| 2,824,636 | 2/58 | Troendly et al. | 192—45.1 |
| 2,881,886 | 4/59 | Troendly et al. | 192—45.1 |
| 3,019,873 | 2/62 | Ferris et al. | 192—45.1 |
| 3,066,779 | 12/62 | Maurer et al. | 192—45.1 |
| 3,087,589 | 4/63 | Gorsky | 192—113 |
| 3,124,228 | 3/64 | Candela | 192—45.1 |

DAVID J. WILLIAMOWSKY, *Primary Examiner.*